(12) United States Patent
Kapinos et al.

(10) Patent No.: US 10,650,218 B2
(45) Date of Patent: May 12, 2020

(54) FINGERPRINT AUTHENTICATION

(71) Applicant: Lenovo (Singapore) Pte. Ltd., Singapore (SG)

(72) Inventors: Robert James Kapinos, Durham, NC (US); Scott Wentao Li, Wake, NC (US); Timothy Winthrop Kingsbury, Cary, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 81 days.

(21) Appl. No.: 15/813,124

(22) Filed: Nov. 14, 2017

(65) Prior Publication Data

US 2019/0147217 A1 May 16, 2019

(51) Int. Cl.
*G06K 9/00* (2006.01)
(52) U.S. Cl.
CPC ....... *G06K 9/00087* (2013.01); *G06K 9/0008* (2013.01); *G06K 9/00013* (2013.01); *G06K 9/00073* (2013.01); *G06K 9/00926* (2013.01)
(58) Field of Classification Search
None
See application file for complete search history.

(56) References Cited

U.S. PATENT DOCUMENTS

| 2002/0154793 | A1* | 10/2002 | Hillhouse | .......... | G06K 9/00087 |
| | | | | | 382/115 |
| 2008/0187189 | A1* | 8/2008 | Shin | .................... | G06K 9/0002 |
| | | | | | 382/124 |
| 2008/0212846 | A1* | 9/2008 | Yamamoto | ......... | G06K 9/00087 |
| | | | | | 382/115 |
| 2014/0375786 | A1* | 12/2014 | Mankowski | ....... | G06K 9/00033 |
| | | | | | 348/77 |
| 2016/0171280 | A1* | 6/2016 | Han | ................... | G06K 9/00067 |
| | | | | | 348/77 |

OTHER PUBLICATIONS

Ryu, Choonwoo, Hakil Kim, and Anil K. Jain. "Template adaptation based fingerprint verification." 18th International Conference on Pattern Recognition (ICPR'06). vol. 4. IEEE, 2006. (Year: 2006).*
Harmon, K., Can You Lose Your Fingerprints?, Scientific American, May 29, 2009 (8 pages).
Dass, Sarat & Pankanti, S & Prabhakar, Salil & Zhu, Y. (2009). "On the Individuality of Fingerprints: Models and Methods" https://www.stt.msu.edu/~sdass/papers/encyclopedia.pdf (26 pages).

(Continued)

*Primary Examiner* — Vu Le
*Assistant Examiner* — Tracy Mangialaschi
(74) *Attorney, Agent, or Firm* — Brian J. Pangrle

(57) ABSTRACT

A device can include a fingerprint reader that generates fingerprint data representative of a fingerprint of a finger; circuitry that authenticates the fingerprint via an authentication process and that identifies a change of the fingerprint based at least in part on the generated fingerprint data and historical fingerprint data; and circuitry that, responsive to the identification of the change of the fingerprint, revises the authentication process based at least in part on at least a portion of the received fingerprint data.

17 Claims, 10 Drawing Sheets

(56) References Cited

OTHER PUBLICATIONS

Knapik et al., Abstract: Friction blisters. Pathophysiology, prevention and treatment. Sports Med. Sep. 1995;20 (3)136-47 (1 page).
System Plus Consulting, Qualcomm Snapdragon Sense ID 3D Qualcomm's New Ultrasonic Fingerprint Sensor, Reverse Costing & Technology Analysis Report, Aug. 2016 (5 pages).
Hughes et al., Reduced perfusion in systemic sclerosis digital ulcers (both fingertip and extensor) can be increased by topical application of glyceryl trinitrate, Microvascular Research 111 (2017) 32-36, Available Online Dec. 24, 2016 (5 pages).
Microsoft, Introduction to the Windows Biometric Framework (WBF), Dec. 15, 2008 (12 pages).
Cleveland Clinic, Foot & Skin Related Complications of Diabetes, Apr. 27, 2017 (5 pages).
Microsoft, Getting Started with Biometric Drivers, Apr. 20, 2017 (1 page).
Lenovo, How to configure Fingerprint Reader software—ThinkPad, Jun. 8, 2015 (19 pages).
Microsoft, IOCTL_BIOMETRIC_CALIBRATE control code, 2015 (2 pages).
Lenovo, Lenovo Preferred Pro USB Fingerprint Keyboard, Third Edition, Jan. 2016 (2 pages).
Miaxis Biometrics Co., Ltd., SM-621 Fingerprint Verification Module User Manual (V1.0), Jan. 24, 2007 (36 pages).
Abraham et al., Optimal management of digital ulcers in systemic sclerosis, Therapeutics and Clinical Risk Management, 2015:11 939-947 (9 pages).
Crown, D.A., The Development of Latent Fingerprints with Ninhydrin, 60 J. Crim. L. Criminology & Police Sci. 258 (1969) (8 pages).
Microsoft, WINBIO_CALIBRATION_INFO structure, 2015 (2 pages).

* cited by examiner

FINGERPRINT AUTHENTICATION

TECHNICAL FIELD

Subject matter disclosed herein generally relates to biometric technology for computing or other devices.

BACKGROUND

A device can include or be operatively coupled to a biometric sensor such as, for example, a fingerprint reader.

SUMMARY

A device can include a fingerprint reader that generates fingerprint data representative of a fingerprint of a finger; circuitry that authenticates the fingerprint via an authentication process and that identifies a change of the fingerprint based at least in part on the generated fingerprint data and historical fingerprint data; and circuitry that, responsive to the identification of the change of the fingerprint, revises the authentication process based at least in part on at least a portion of the received fingerprint data. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
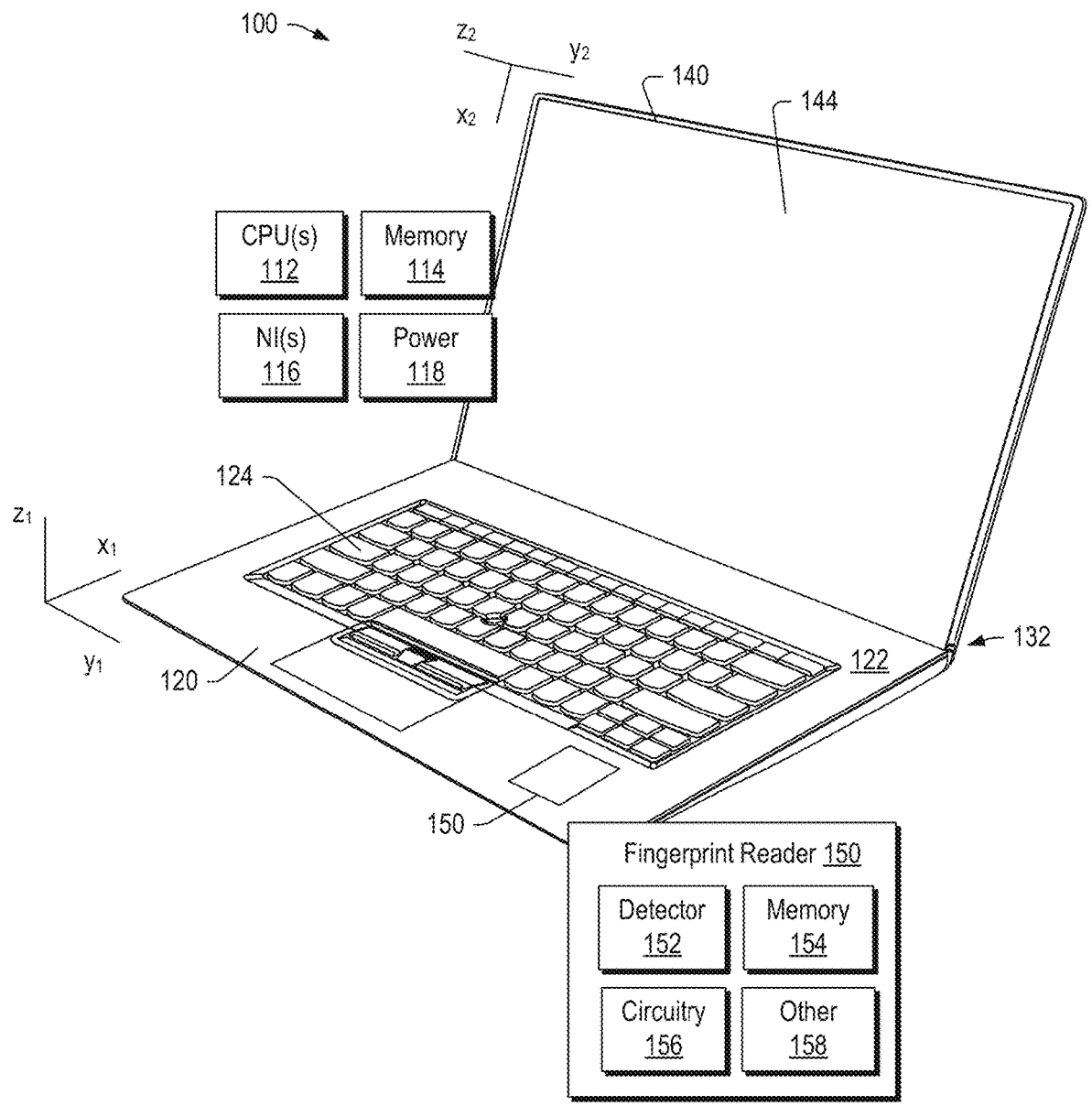
FIG. 1 is a diagram of an example of a device and an example of a fingerprint reader that may be part of the device.

FIG. 1 shows an example of a device 100 that includes a keyboard housing 120 and a display housing 140 that are pivotable with respect to each other via movement about one or more hinges 132 (e.g., hinge assemblies). The device 100 may be a device such as, for example, a computing device (e.g., an information handling device).

As an example, the device 100 may include one or more processors 112, memory 114 (e.g., one or more memory devices), one or more network interfaces 116, and one or more power cells 118. Such components may be, for example, housed with the keyboard housing 120, the display housing 140, or the keyboard housing 120 and the display housing 140.

As shown in the example of FIG. 1, the keyboard housing 120 includes a keyboard 124 with keys and the display housing 140 includes a display 144. In such an example, the keyboard 124 is defined in a first Cartesian coordinate system as having a depth along an x-axis ($x_1$), a width along a y-axis ($y_1$) and a height or thickness along a z-axis ($z_1$) that extends in a direction outwardly away from touch surfaces of keys of the keyboard 124 and the display 144 is defined in a second Cartesian coordinate system as having a depth along an x-axis ($x_2$), a width along a y-axis ($y_2$) and a height or thickness along a z-axis ($z_2$) that extends in a direction outwardly away from a viewing surface of the display 144. As an example, a coordinate system may be right-handed or left-handed.

In the example of FIG. 1, the one or more hinges 132 pivotably connect the keyboard housing 120 and the display housing 140 for orienting the display housing 140 with respect to the keyboard housing 120. For example, orientations may include orientations definable with respect to an axis (e.g., or axes).

As an example, the keyboard housing 120 can include a frontal surface 122 and include a fingerprint reader 150. As shown, the fingerprint reader 150 can include a detector 152, memory 154, circuitry 156 and one or more other components 158. The fingerprint reader 150 can be provided as a unit that can be integrated into the device 100 such that the fingerprint reader 150 is operatively coupled to the device 100, for example, via a biometric framework. Such a framework may allow for interactions between the fingerprint reader 150 and one or more levels of one or more environments (e.g., an operating system environment, a BIOS environment, a pre-BIOS environment, etc.). As an example, an environment may be established via execution of instructions by one or more processors where the instructions may be stored in memory (e.g., boot memory, etc.).

A fingerprint reader may include circuitry that can capture a digital image of a fingerprint, which may be, for example, referred to as a "live" scan. A scan can be a dataset that can be digitally processed to create a biometric template (e.g., a collection of extracted features) which may be referred to as a base case. As an example, a biometric template or base case may be stored and accessible for purposes of matching (e.g., to authenticate a live scan, etc.). A stored biometric template, base case, or information derived therefrom and stored in memory prior to a live scan can be referred to as historical fingerprint data. As an example, a fingerprint reader can generate fingerprint data representative of a fingerprint of a finger where such data may be referred to as live scan data. As an example, a fingerprint reader and/or a biometric framework can include circuitry that authenticates a fingerprint via an authentication process and that identifies a change of the fingerprint based at least in part on the generated fingerprint data (e.g., live scan data) and historical fingerprint data (e.g., stored data from or based at least in part on one or more prior scans, etc.).

A fingerprint reader may utilize one or more types of circuitry. For example, consider a fingerprint reader that utilizes one or more of optical, capacitive, RF, thermal, piezoresistive, ultrasonic, piezoelectric, or MEMS circuitry.

As an example, a fingerprint reader can include one or more features of the NEXT Biometrics NB-1010-U and/or NB-2020-U fingerprint readers, which implement thermal technology. As an example, a fingerprint reader can include one or more features of the EgisTec ET300 fingerprint reader. As an example, a fingerprint reader can include one or more features of the Fingerprint Cards FPC 1025 fingerprint reader. As an example, a fingerprint reader can include one or more features of the Qualcomm Snapdragon Sense™ ID 3D fingerprint reader, which implements ultrasonic technology and a biometric integrated circuit that provides for data security. Ultrasonic technology (e.g., piezoelectric transducers, piezoelectric materials, etc.) can allow for scanning through an OLED display (e.g., approximately 1200 µm thick), scanning through aluminum (e.g., approximately 650 µm thick), and scanning through glass (e.g., approximately 800 µm thick).

As an example, one or more types of fingerprint readers can include one or more types of interfaces that provide for power and/or communication of information (e.g., via one or more busses). For example, consider a fingerprint reader as a unit that can be operatively coupled to circuitry of a device such as a computing device in a manner that the unit receives power and can transmit and/or receive information.

As an example, a fingerprint reader can include an active area (e.g., a window) of approximately 1600 mm$^2$ or less. For example, consider an active area of approximately 12 mm×12 mm (e.g., 144 mm$^2$) with a resolution of approximately 18000 pixels for a pixel density of approximately 500 ppi. Such a fingerprint reader may utilize one or more technologies. As an example, a capacitive touch technology may image a fingerprint from subepidermal layer(s) of a finger.

As an example, one or more technologies of a fingerprint reader may provide for acquiring information as to sweat pores (e.g., sweat ducts) of a finger. As an example, a method can include analyzing sweat pore characteristics, for example, as part of an authentication process. As an example, sweat pore information may be utilized for one or more purposes (e.g., analyzing variability of scans, analyzing physiologic condition(s), etc.).

As an example, one or more matching algorithms may be utilized as part of an analysis that includes comparing previously stored data to acquired data (e.g., live scan data) for authentication purposes. Such an approach may include comparing an original image directly to a candidate image or, for example, comparing certain features of an original image (e.g., base case data) to certain features of a candidate image (e.g., candidate data).

As an example, a method can include one or more types of pre-processing that may aim to enhance quality of an image (e.g., data), for example, by filtering and/or removing unnecessary noise. As an example, minutiae extraction may be carried out by applying a ridge thinning algorithm that can remove redundant pixels of ridges. In such an example, thinned ridges of a fingerprint image may be marked with a unique ID to facilitate further operation. After minutiae extraction, a method may include, for example, false minutiae removal (e.g., due to a lack of amount of ink and cross link among ridges that may lead to inaccuracy in a fingerprint recognition process). As mentioned, sweat pore information may be analyzed as a characteristic of a finger (e.g., a fingerprint characteristic).

As an example, a method can include utilizing one or more pattern-based (or image-based) algorithms. For example, one or more pattern based algorithms may be implemented to compare particular fingerprint patterns (e.g., arch, whorl, and loop) between a previously stored template (e.g., base case) and a candidate fingerprint (e.g., live scan data). Such an approach can include aligning data (e.g., image data, etc.). For example, a method may include finding a central point in a fingerprint image and centering on that point (e.g., as a fiducial point). As an example, in a pattern-based approach, a template can include type, size, and orientation of patterns within an aligned fingerprint image (e.g., image data). As an example, a candidate fingerprint image may be graphically compared with a template image to determine a degree to which they match.

Various computing devices such as laptop, or notebook, computing devices can be characterized at least in part by a footprint. For example, the device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

The device 100 of FIG. 1 is shown as a laptop (e.g., laptop computer), which may be considered to be a mobile device, for example, a device being of a size and a weight suitable for transport (e.g., in a shoulder bag, a handbag, a briefcase, etc.).

Figure 2:
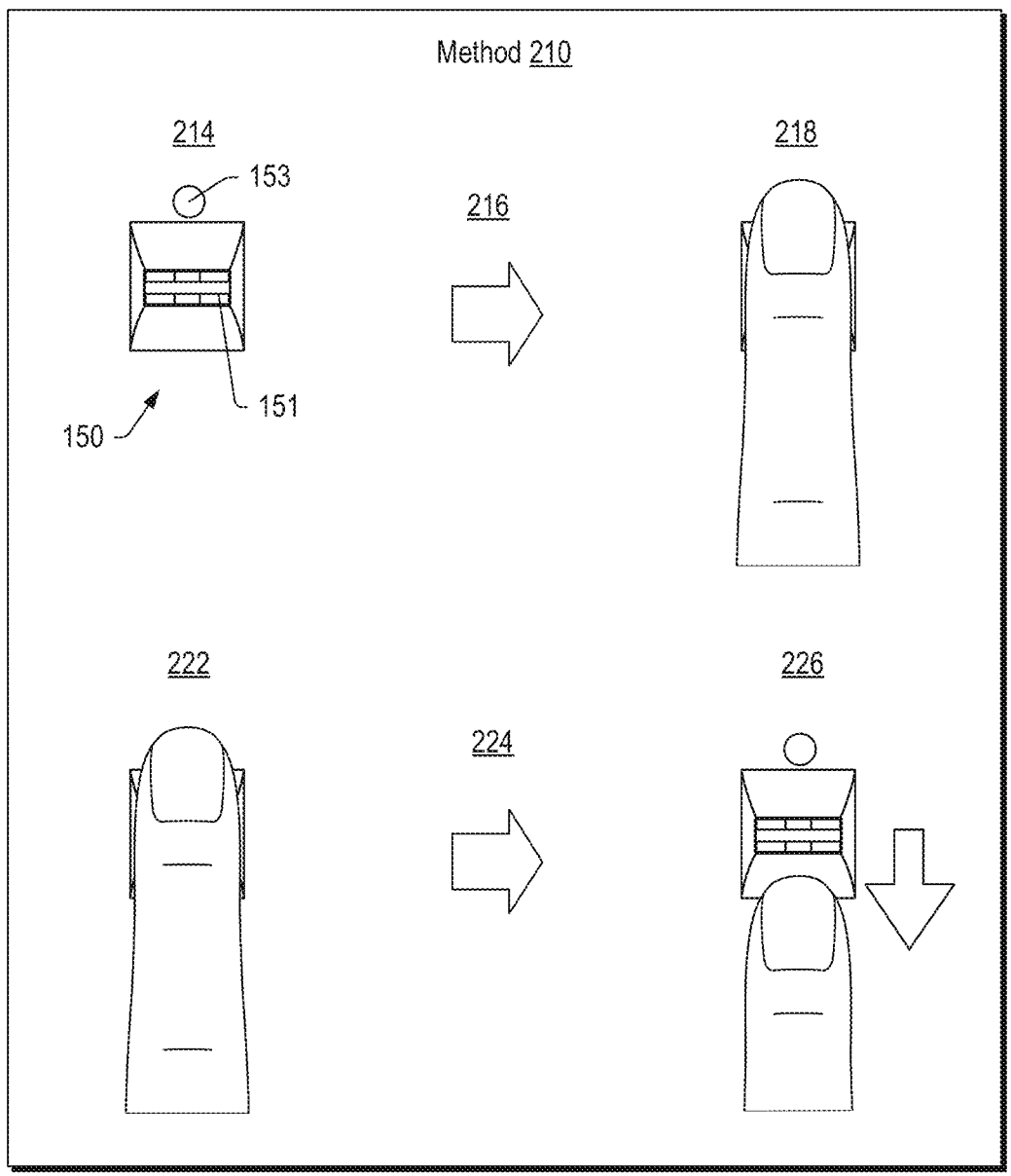
FIG. 2 is a diagram of an example of a method with respect to an example of a fingerprint reader and examples of fingerprint data.
Figure 2:
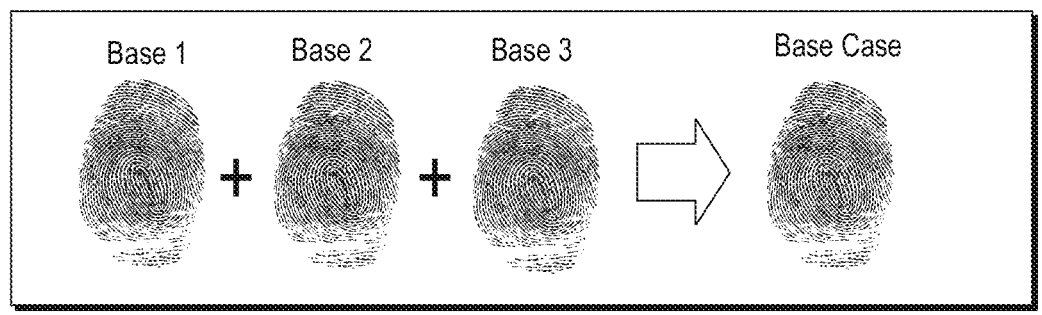

FIG. 2 shows an example of a method 210 that includes a provision block 214 for providing a fingerprint reader 150, a reception block 216 for receiving a finger by the fingerprint reader 150, and a positioning block 218 for positioning the finger with respect to the fingerprint reader 150. Upon positioning, the fingerprint reader 150 may become active for acquiring information (e.g., for detecting a fingerprint, generating fingerprint data, sensing a fingerprint, etc.). As shown in FIG. 2, the method 210 includes an active block 222 for activating the fingerprint reader 150, a data acquisition block 224 for acquiring fingerprint data via the fingerprint reader 150, and a termination block 226 for terminating acquisition of fingerprint data via the fingerprint reader 150. As shown, the termination block 226 may be triggered by an absence of a finger with respect to the fingerprint reader 150.

In the example of FIG. 2, the fingerprint reader 150 is shown as including a window 151 as well as a sensor 153, which may sense the presence of a finger with respect to the fingerprint window 151, etc. As an example, the sensor 153 may be a proximity sensor that can sense a finger being placed proximate to the sensor 153, which may indicate that the finger is likely aligned with respect to the window 151 for purposes of having a fingerprint of the finger read by the fingerprint reader 150.

In the example of FIG. 2, the fingerprint reader 150 may be a line reader in that the fingerprint reader 150 acquires fingerprint information in sections or segments as a finger is translated across the window 151.

A computing device may include circuitry for enrolling a fingerprint. For example, where a device is operatively coupled to more than one fingerprint reader, an option may exist to select a particular fingerprint reader. For enrollment, a user can swipe a finger over a fingerprint reader where, for example, a progress bar may be rendered to a display of a computing device to indicate progress of reading.

As an example, a computing device can include an option to enroll more than one finger, which may help to allow authentication in the instance that one finger of the enrolled fingers is physically injured (e.g., as to its fingerprint or ability to swipe, etc.).

As an example, a computing device may include associating a password (e.g., a PIN code, etc.) with a fingerprint or fingerprints. As an example, a fingerprint may be enrolled for performing a power-on operation of a computing device and/or for access to one or more drive passwords (e.g., BIOS passwords, etc.).

As an example, a fingerprint reader may be setup in BIOS. For example, consider setting a power-on password or a drive password for a computing device (e.g., or both), turning off the computing device and then turning it on. In such an example, a prompt may be rendered to a display for a user to swipe a finger with respect to a fingerprint reader. Next, a prompt may be rendered for entry of the power-on password, drive password, or both as requested. In such an example, the enrolled fingerprint is then associated with the power-on password, the drive password, or both. In such an example, a user may log on to the computing device by swiping her finger with respect to the fingerprint reader. In the foregoing example, if the password is lost and the finger not authenticatable (e.g., for one or more reasons), the computing device may be unable to boot in a manner where the password can be changed.

A BIOS Setup Utility program of a computing device may offer one or more choices such as, for example, pre-desktop authentication (e.g., enables or disables the fingerprint authentication before the operating system is installed); reader priority (e.g., external or internal fingerprint sensor as the priority); and security mode (e.g., specify settings of the security mode).

A fingerprint reader may be damaged in a manner such that operation is compromised. For example, consider one or more of the following: scratching a surface of the reader with a hard, pointed object; scraping a surface of the reader with a fingernail or anything hard; and using or touching the reader with a dirty finger.

As to cleaning of a surface of a fingerprint reader, a dry, soft, lint-free cloth may be utilized where the surface of the reader is dirty or stained, the surface of the reader is wet, or the reader often fails to enroll or authenticate a fingerprint.

Various conditions may confound enrollment and/or authentication. For example, consider one or more of the following conditions: a finger is wrinkled; a finger is rough, dry, or injured; a finger is stained with dirt, mud, or oil; a surface of a finger is very different from what it was when enrolled; a finger is wet; or a finger that has not been enrolled is used.

Where enrollment or authentication are problematic, some possible actions can include cleaning or wiping hands to remove excess dirt or moisture from the fingers, enroll and use a different finger for authentication, if hands are too dry, apply lotion.

Referring again to FIG. 2, as shown, the fingerprint reader 150 may acquire data for a number of swipes. For example, consider three swipes where each swipe becomes part of a base case for enrollment. In such an example, registration and averaging may occur to generate the base case from a number of swipes. As an example, registration can include de-skewing, shifting, etc. In such an example, one or more fiducials may be utilized to align information. As an example, some regions may extend outside an overlapped region (e.g., a region that is present in two or more swipes). As an example, a base case may be defined by an area where certain portions of the area may be more certain due in part to information from multiple swipes.

As an example, a base case may be stored as an array such as a pixel array and/or in another form. For example, a fingerprint may be vectorized and/or otherwise broken down into components, equations, etc.

Figure 3:
FIG. 3 is a diagram of an example of a classification system, examples of fingerprint read variability and examples of fingerprint analysis.
Figure 3:
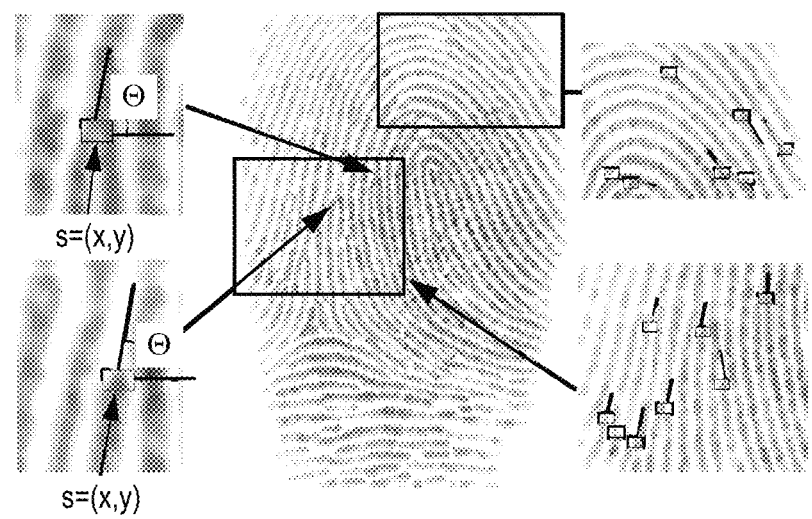

FIG. 3 shows an example of a classification system 370 with respect to an example of a fingerprint. In the example of FIG. 3, the classification system 370 can include loop classes 372, whorl classes 374, arch classes 376 and optionally one or more other classes 378.

FIG. 3 further shows various examples of fingerprints with respect to read variability 380 and various examples of analysis techniques 390 as to features of a fingerprint (see, e.g., Dass, Sarat & Pankanti, S & Prabhakar, Salil & Zhu, Y. (2009). "On the Individuality of Fingerprints: Models and Methods", which is incorporated by reference herein). As an example, a method can include accounting for read variability and analyzing, which may be performed according to one or more classification systems. As an example, such a method may be performed at least in part via circuitry of a fingerprint reader and optionally at least in part via circuitry of a biometric framework.

In the Henry system of classification, there are three basic fingerprint patterns: loop, whorl, and arch, which tend to make up about 60% to about 65%, about 30% to about 35%, and about 5% of most fingerprints, respectively. There are also more complex classification systems that break down patterns even further, for example, into plain arches or tented arches, and into loops that may be radial or ulnar, depending on the side of the hand toward which the tail points. Ulnar loops start on the pinky-side of the finger, the side closer to the ulna, the lower arm bone. Radial loops start on the thumb-side of the finger, the side closer to the radius. Whorls may also have sub-group classifications including plain whorls, accidental whorls, double loop whorls, peacock's eye, composite, and central pocket loop whorls.

Approximately five percent of the population is affected by one or more types of skin disorders, which can include one or more types of chronic skin diseases. Such affections can cause one or more fingerprints to vary over time. An additional approximately one percent of the population suffers from periodic finger swelling due to one or more conditions such as, for example, water retention, diabetes, or long term growth. Approximately twenty percent of the population experiences finger calluses, warts, or lesions that slowly change and can alter areas that can affect fingerprint recognition (e.g., authentication, etc.). At some time, over approximately fifty percent of the population will experience a short-term fingerprint altering event such as a fungus or skin chapping.

As mentioned, where authentication of a fingerprint of a finger of an individual via a fingerprint reader fails, a prompt may be rendered to a display for the individual to re-enroll one or more of his fingers. Failure of authentication can occur when a fingerprint of a finger of an individual has changed sufficiently to make detection unreliable. Failure to authenticate a biometric or biometrics and/or re-enrollment as to a biometric or biometrics can be inconvenient for a user. Such inconvenience can be reoccurring where one or more conditions give rise to trending changes in an individual's fingerprint or fingerprints.

As mentioned, a fingerprint reader unit may be associated with a biometric framework that allows for enrollment of one or more fingers. Such an approach may work well in the case of a wart on one finger but may be suboptimal (e.g., fail) where, for example, calluses or a skin infection effect multiple fingers or an entire hand.

As an example, a fingerprint reader and/or an associated biometric framework can include circuitry that can account for the nature of one or more slowly changing fingerprints. In such an example, the fingerprint reader and/or the biometric framework can experience no or fewer failures to authenticate (e.g., mismatches, etc.) as time progresses.

As an example, a fingerprint reader and/or a biometric framework can be equipped with an algorithm that detects multiple tries with success at the end, and analyzes the data from the failures for similarity to the success case. In such an example, if the similarity is enough, and the failure is due to some slight variation in the data patterns, the data from the failure case is added to the recognition dataset. In such an approach, as progressive changes occur, the fingerprint reader and/or the biometric framework can continue to understand the user's identity (e.g., authenticate and allow for instantiation of functions associated with authentication, etc.).

As an example, additional data can be created with a time-out value or use counter. In such an example, if the additional data are not used to match, it may be discontinued as a data source and the space reclaimed. Or, for example, such additional data may be stored, transmitted, processed, etc., which may provide one or more diagnoses as to a cause, a condition, etc. (e.g., as to a fingerprint reader, a finger, fingers, etc.).

As an example, data are not added to a base case (e.g., enrollment data or enrollment dataset), but a prompt is issued that notifies a user that re-enrollment is recommended, for example, by directing to a re-enrollment graphical user interface rendered to a display. Such an approach may provide for a good reading to be taken to replace the data that fingerprint drift has negated.

As an example, a fingerprint reader and/or a biometric framework may analyze changes with respect to time and classify such changes. For example, an acute injury that occurs in an instant (e.g., a cut to a finger) may be classified differently than a fungal infection to a fingerprint, a slowly evolving skin ulcer, swelling, callus formation, etc. Where an acute injury occurs to a finger, such a classification may cause a fingerprint reader and/or a biometric framework to prompt a user to utilize a different finger and/or to resort to password security as a security metric (e.g., where a hand may be injured acutely as to multiple fingerprints that have been enrolled, etc.). Various conditions may require immobilization of a hand, an arm, etc., such that physically positioning a finger with respect to a fingerprint reader is impractical. In such instances, a user may resort to one or more other security metrics (e.g., voice, retina, etc.).

As to various slowly changing conditions, a finger may experience one or more of a degradation phase, a stasis phase, a healing phase, etc. As an example, a fingerprint reader and/or an associated biometric framework may operate in a manner that allows for authentication during such phases by augmenting data such as base case data (e.g., a base case dataset, etc.). In such an example, augmenting can occur iteratively, for example, as frequently as every logon or less frequently (e.g., a daily basis, a weekly basis, a differential based basis, etc.).

As an example, a method can include determining drift from stored data and augmenting stored data, for example, to one or more regions of a fingerprint. Augmentation can include replacing one or more regions of a fingerprint as represented by data. Such a method can help to assure authentication where a user experiences slow changes to a fingerprint of a finger or fingers. As an example, an acute injury or change may occur on a time frame of less than one hour; whereas, a slow change can occur on a time frame that is greater than one hour as may be associated with metabolism of an individual, metabolism of a fungus, progression of a disease or a side effect of the disease, etc.

As an example, a method can include returning or restoring a base case where, for example, a progression has passed through two or more phases that include a "healing" phase where a fingerprint returns substantially to a base case fingerprint. As an example, a fingerprint reader and/or a biometric framework may allow a user to review one or more methods as to changes in data representative of changes in one or more fingerprints. For example, a graphical user interface may be rendered to a display that includes events with respect to time. In such an example, an image of a fingerprint may be rendered to the display and progressed through time such that a user can visualize how a fingerprint or fingerprints changed. Such information may be utilized for purposes of diagnosis. For example, a video file (e.g., mpeg, .avi, etc.) may be generated that can be suitable for transmission to a healthcare professional for review.

As an example, an analysis may determine one or more factors are associated with authentication or authentication attempts. For example, consider off-centered, grown in size (e.g., weight), obscured due to dirt, etc.

As an example, data may be processed as to one or more signatures of errors and/or changes. Such an approach may utilize one or more signatures to expand the scope of what is acceptable for authentication. As an example, a standard deviation of a region (e.g., an area) of a fingerprint may be increased as to what is acceptable for that region in terms of authentication (e.g., while another region or regions differ in standard deviation).

In the example of FIG. 2, the base 1, base 2 and base 3 data can be expected to differ as swiping tends to differ in various aspects from swipe to swipe (see, e.g., examples of read variability 380 of FIG. 3). For example, a finger can be skewed differently, pressured differently, moved differently, etc. As such, readings are seldom "identical". As an example, data can be point cloud data where a fingerprint is represented as a cloud of data points, which may, for example, be a number of points ranging from approximately 5 to more than approximately 100. In such an example, an authentication process can compare acquired data to stored data substantially on a point-by-point basis. As an example, a match may be a probabilistic match such that a numeric value may be assigned that represents an extent of matching (e.g., 50 percent, 60 percent, 70 percent, 80 percent, 90 percent, 95 percent, etc.). As an example, a method may determine a probabilistic match metric and compare that metric to a predefined number to decide whether authentication is successful, whether authentication should fail, whether one or more other actions are warranted, etc.

As an example, a method can implement a range for authentication without further action, another range for authentication with data augmentation, and another range for failure to authenticate. In such an example, a fingerprint reader and/or biometric framework can include at least two ranges that allow for authentication success where one range may consider a fingerprint to be relatively static (e.g., a stasis phase) and where another range may consider a fingerprint to be changing (e.g., a degradation phase and/or a healing phase). As an example, a fingerprint reader and/or a biometric framework may distinguish a degradation phase from a healing phase, for example, with respect to a base case. In such an example, deviation from the base case that increases over time may be deemed degradation whereas deviation from the base case that decreases over time may be deemed healing (e.g., reproaching the base case). In such example, one or more sets of data may be stored, analyzed, discarded, etc. For example, where healing is noted, one or more prior datasets as associated with degradation may optionally be discarded. Such an approach may help to free memory of a fingerprint reader that has a limited amount of memory, which can be isolated and secured such that only the fingerprint reader can access that memory (e.g., a fingerprint reader can be a secure unit such that certain biometric information is not accessible by external circuitry. As an example, a fingerprint reader can include data cleansing circuitry that can strip certain biometric information to allow some amount of biometric information to be accessed, transmitted, etc., where, for example, that amount of biometric information is insufficient to recreate a replica of an individual's fingerprint or fingerprints. In such an example, the cleansed biometric information that can be accessed, transmitted, etc., may be utilized for purposes of diagnosis, which can include fingerprint reader and/or finger diagnoses. As an example, a fingerprint reader diagnosis may result in a recommendation for repair, reset, replacement, etc., of a fingerprint reader (e.g., via an OEM supplier, etc.).

As mentioned, one or more thresholds may be utilized as one or more metrics to determine what action(s) should occur and/or are permissible. Such one or more thresholds may be probabilistic, statistical, etc.

As an example, fingerprint based recognition may be described in terms of a test of statistical hypotheses. For example, consider a query dataset corresponding to an "unknown" identity being acquired where an analysis may aim to determine if the query dataset belongs to an individual. Such an approach can include accessing a base case dataset (e.g., a template, data point cloud, etc.) and performing one or more comparisons (e.g., matching) as part of an analysis to test a hypothesis or hypotheses (e.g., belongs to individual or does not belong to individual). An analysis may aim to determine a degree of similarity, which can be based on matching of minutiae (e.g., minutiae pairs, etc.).

As an example, one or more statistical and/or probabilistic techniques may be utilized to identify one or more regions of a fingerprint may differ, for example, in a manner that may be associated with change such as a slow change in a fingerprint. For example, a match metric may be determined on a region by region basis, where a region may be defined a priori and/or dynamically. As an example, a region may grow (e.g., expand) responsive to changes that may be associated with a disease, callusing, etc. As an example, a metric may be an area metric that tracks the area (e.g., at least numerically) as to increases and/or decreases. As an example, an augmentation dataset may increase and/or decrease in terms of area or areas represented responsive to changes that may occur for a fingerprint of a finger or fingerprints of fingers. As an example, one or more augmentation datasets may be utilized as an alternative to data of a region or regions of a base case dataset. Such an approach may aim to help assure authentication of an individual's fingerprint (or fingerprints) when that individual experiences one or more types of changes to finger skin.

As an example, a change to skin may occur responsive to an individual undertaking one or more new activities and/or responsive to one or more changes in weather (e.g., rainy, cold, hot, etc.). Such activities or weather changes may result in slow changes in skin of a finger or fingers (e.g., directly and/or indirectly).

As an example, a fungal infection may result in roughness or patch peeling of finger skin where new skin may grow that may differ from old skin, for example, over a period of time. As an example, a fingerprint reader and/or a biometric framework may provide for successful authentication of an individual's fingerprint during such progressions.

As an example, a method may provide for a tiered process where one or more triggers may provide for tier transition (e.g., tier selection, etc.). As an example, a trigger may be initiated where a user was able to log in with one try, but now multiple tries are required to log in. Such a trigger may implement an analysis for one or more regions of a fingerprint that may be changing slowly. Another type of trigger, as mentioned, may cause a prompt to be rendered to a display to suggest that a user utilize a different finger.

Figure 4:
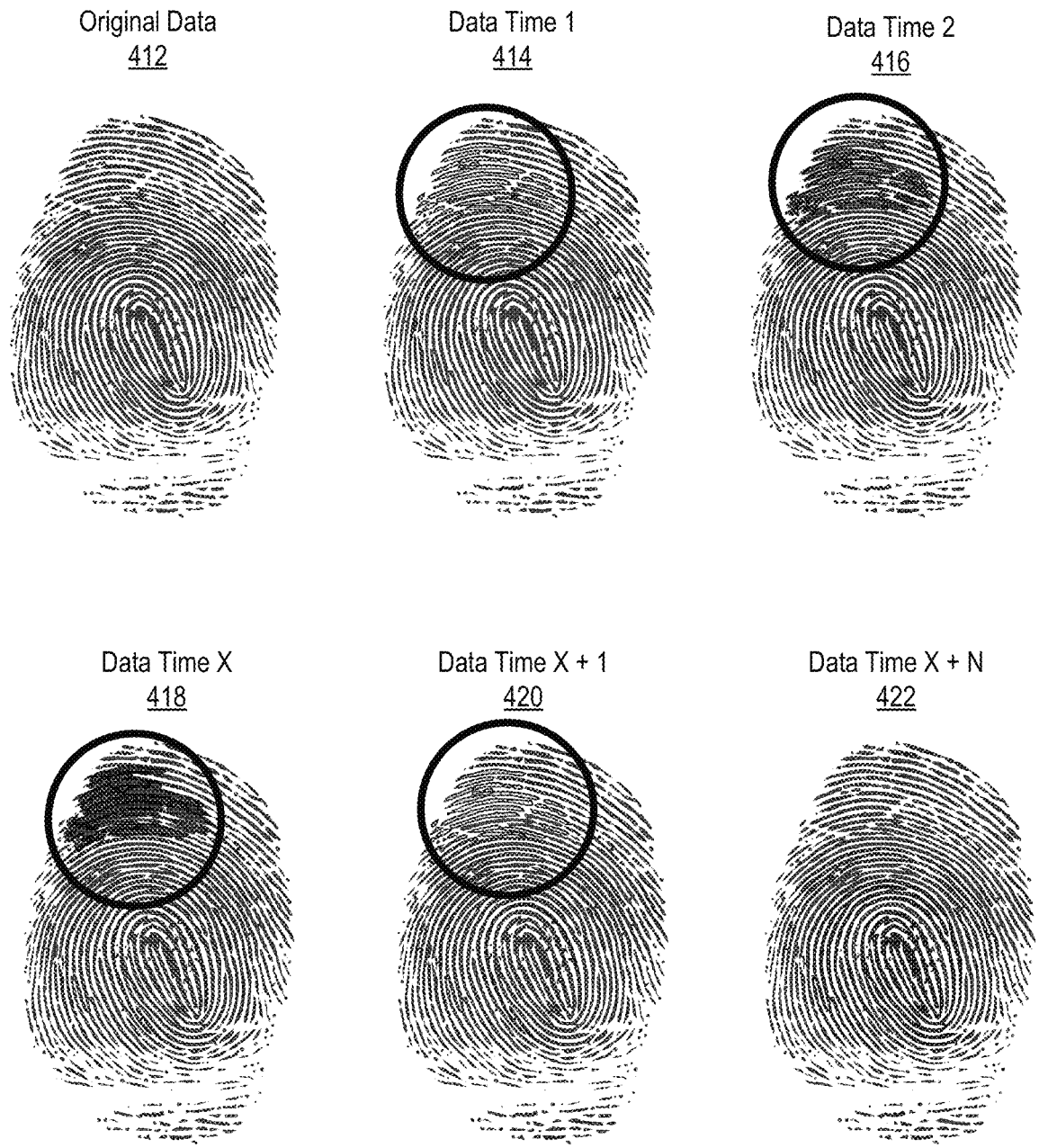
FIG. 4 is a diagram of a series of examples of fingerprint data.

FIG. 4 shows an example of a series of fingerprints 412, 414, 416, 418, 420, and 422, with respect to time where a region of a fingerprint changes, first deviating from the original data and then returning back to a closer match with the original data. In such an example, a method can include generating augmentation data (e.g., an augmentation dataset) that is utilized in lieu of a portion of stored original data. As shown in FIG. 4, the augmentation data may change with respect to time. As an example, augmentation data may expand and/or shrink and/or change shape (e.g., boundaries) with respect to time. As an example, a new region or new regions may emerge in addition to an existing augmentation region. In such an example, one or more regions may be tracked and/or handled individually. As an example, one or more regions may be analyzed individually and/or as a group or groups.

Figure 5:
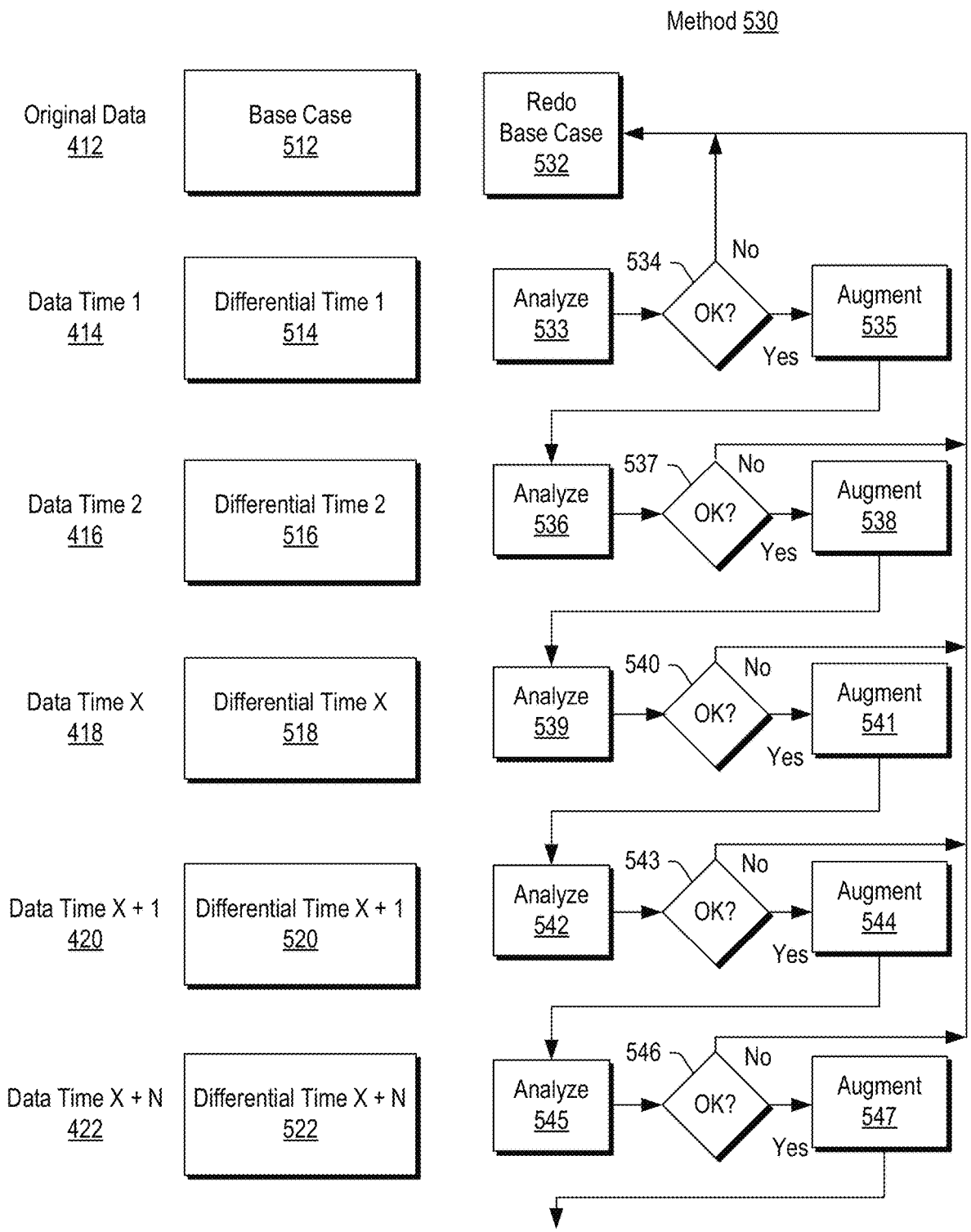
FIG. 5 is a diagram of an example of a method.

FIG. 5 shows an example of a method 530 with respect to the example data of FIG. 4. As shown, the data 412 may be base case data 512 while data 414 to 422 may be processed to be differential data 514, 516, 518, 520 and 522.

As shown in FIG. 5, the method 530 can include a redo block 532 for redoing a base case (e.g., reenrollment, etc.), which may be performed depending on decisions that can be made per decision blocks 534, 537, 540, 543 and 546 with respect to analysis results of analysis blocks 533, 536, 539, 542 and 545. As shown, a decision can be made to augment data per one or more augmentation blocks 535, 538, 541, 544 and 547. As an example, where a differential is below a trigger metric or metrics, augmentation may be foregone and operation may be of a general or default tier of operation.

Figure 6:
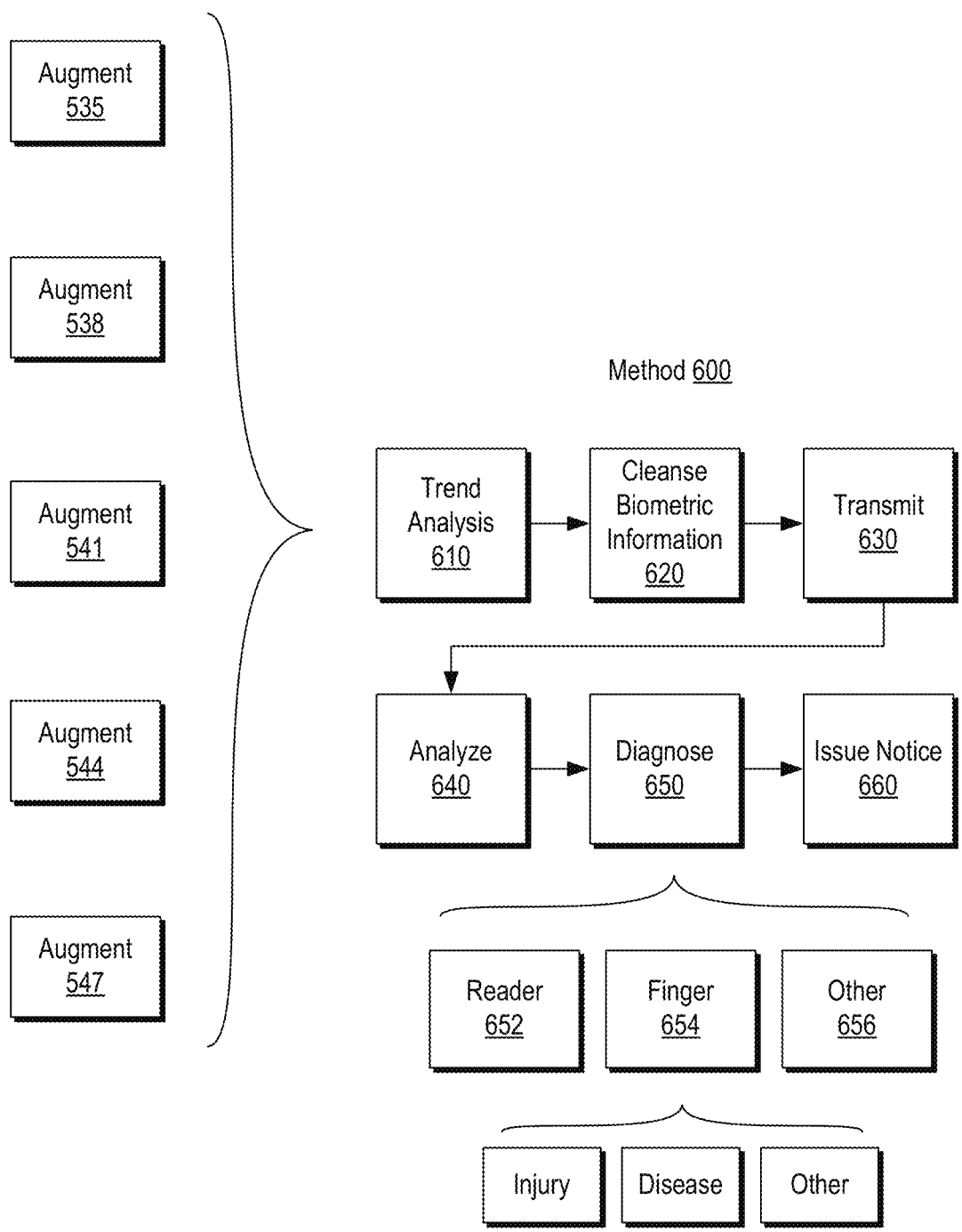
FIG. 6 is a diagram of an example of a method.

FIG. 6 shows an example of a method 600 that includes the augmentation blocks 535, 538, 541, 544 and 547 as representing augmentation data that can be processed via the method 600.

As shown, the method 600 can include a trend analysis block 610 for performing a trend analysis, an optional cleanse block 620 for cleansing biometric information, a transmit block 630 for transmitting biometric information (e.g., optionally cleansed), an analysis block 640 for analyzing transmitted (e.g., received) biometric information (e.g., optionally cleansed), a diagnosis block 650 for diagnosing one or more conditions based at least in part on analysis results of the analysis block 640, and an issuance block 660 for issuing an notice as to one or more diagnoses, which can include issuance of a notice that no diagnosis is made (e.g., no conditions noted, unable to diagnose, etc.).

In the example of FIG. 6, the diagnosis block 650 may provide for reader diagnosis 652, finger diagnosis 654 and/or one or more other types of diagnoses 656. As to the finger diagnosis 654, some examples include injury, disease, etc.

As an example, a method can provide for augmentation of data in a manner that allows an individual to be authenticated by a fingerprint of a finger where the fingerprint includes one or more regions that change over time as may be associated with one or more physiological changes that affect at least a portion of skin of the finger.

As an example, a physiological change can be a blister and/or a callus. As an example, an activity may lead to such a change. For example, consider activities such as woodworking, sculpting, grinding, filing, playing a stringed instrument, rowing, throwing a baseball, stringing racquets, rock climbing, tool use, etc. Such activities can result in friction such that a blister and/or a callus may form that changes one or more regions of skin of a finger. Such changes can vary with respect to time, for example, due to activity and/or physiology.

As an example, a blister may occur due to frictional forces that mechanically separate epidermal cells at level of the stratum spinosum. Hydrostatic pressure can cause a region of such separation to fill with a fluid that is similar in composition to plasma but has a lower protein level. About 6 hours after formation of a blister, cells in the blister base begin to take amino acids and nucleosides; at 24 hours, there is high mitotic activity in the basal cells; at about 48 hours and at about 120 hours, new stratum granulosum and stratum corneum, respectively, may be seen. The magnitude of frictional forces and the number of times that an object cycles across finger skin may determine what type of physiological response occurs.

As an example, a method can include analyzing fingerprint information to determine a rate of change in structural features of a fingerprint. For example, consider a rate of change in size of ridges, in spacing between ridges, in ability to distinguish one ridge from a neighboring ridge, in a number of detectable ridges, etc. In such examples, an analysis can be utilize one or more metrics that are in terms of one or more of a number of pixels, a distance, an area, a direction, etc. As to a blister, as fluid fills a subcutaneous region, skin can expand (e.g., akin to a balloon) such that fingerprint reader image/data changes, ridge spacing increases, ridges become thinner, etc. Conversely, as fluid dissipates, reverse trends in such metrics may be detected through analysis of fingerprint reader image/data. As to calluses, ridge detail can change during and after callus formation. As an example, a method can include augmenting base case data (e.g., enrollment data) with live scan data (e.g., or processed live scan data) as acquired during one or more authentication attempts, which may be successful attempts but with a lower certainty or with a determined trend toward lower certainty. In such an approach, as a callus forms, one or more regions of base case data may be augmented (e.g., averaged, weighted, replaced, etc.) with more recent data that more accurately represents the current state of an individual's finger (or fingers).

Fingerprints can change due to one or more of various factors where such changes may be deemed non-acute changes where an example of an acute change is a cut to the skin of a finger. Some examples of non-acute changes include changes experienced by bricklayers that wear down ridges on their prints by handling relatively heavy, rough materials frequently, changes experienced by people that work with lime (calcium oxide) as its high pH can dissolve top layers of the skin, and changes experienced by people that constantly handle paper during the workday as paper tends to wear down the ridge detail. In such examples, when the activity ceases for an extended period of time, fingerprints tend to return to a pre-activity state (e.g., due to physiological changes that occur on a physiological time scale). As to a paper example, consider a time of year (e.g., tax reporting, etc.) or time of a month (e.g., invoicing, mailing, payroll, etc.) where an individual's work duties involve handling paper. In such an example, during such time or times an individual may develop calluses and/or physiological wear. As such a time or times can be stressful (e.g., hours worked, attention to accuracy, etc.), additional stress as to successfully logging in to a computer or computing system can be reduced where such a computer or computing system includes a fingerprint reader and/or biometric framework that can adapt in a manner that accounts for calluses and/or physiological wear such that the probability of successful login (e.g., authentication) is maintained or increased without an increase in security risk. In particular, as such changes tend to be non-acute (e.g., occurring over a period of a day or days) and as that underlying enrollment data can still be utilized (e.g., as augmented by more recent data), spoofing (e.g., security risk) may be minimal.

Another factor, though on a relatively long scale of time (e.g., years), is aging where elasticity of skin decreases with age such that ridges become thicker in a manner where height between the top of a ridge and the bottom of a furrow becomes narrower such that prominence diminishes. Prominence and applied pressure can be factors that affect fingerprint reader data where less prominence and more applied pressure (pressure of finger against a fingerprint reader window) can decrease accuracy of acquired fingerprint reader data.

As an example, a method may analyze fingerprint reader data (e.g., live scan data, etc.) to determine whether a change is due to applied pressure and/or due to physiology. For example, applied pressure may cause an effect that varies from live scan to live scan with respect to time whereas a physiological change can exhibit a trend with respect to time. As an example, a method can include analyzing fingerprint details in a manner that accounts for variations as to applied pressure, for example, via an applied pressure weighting correction that decreases the influence of data acquired for "high" applied pressure live scans. Such an approach may increase accuracy of physiological trend detection and, for example, diagnosis of one or more conditions (e.g., physiological conditions). As to another situation where stress can exist, consider chemotherapy where a drug such as capecitabine has been reported to causes chemotherapy-induced acral erythema, which can cause swelling, pain and peeling of skin of the hands. In such an example, a patient may still work at a workplace where a computer or computing system requires biometric login via a fingerprint reader. As an example, a method that can augment enrollment data responsive to non-acute physiological changes may allow such a chemotherapy patient to successfully login during a course of chemotherapy (e.g., and after as skin recovers, etc.). Such a method may reduce stress (e.g., emotional stress) of the patient, which, in turn, may be beneficial for the patient's well-being (e.g., quality of life) and recovery.

Figure 7:
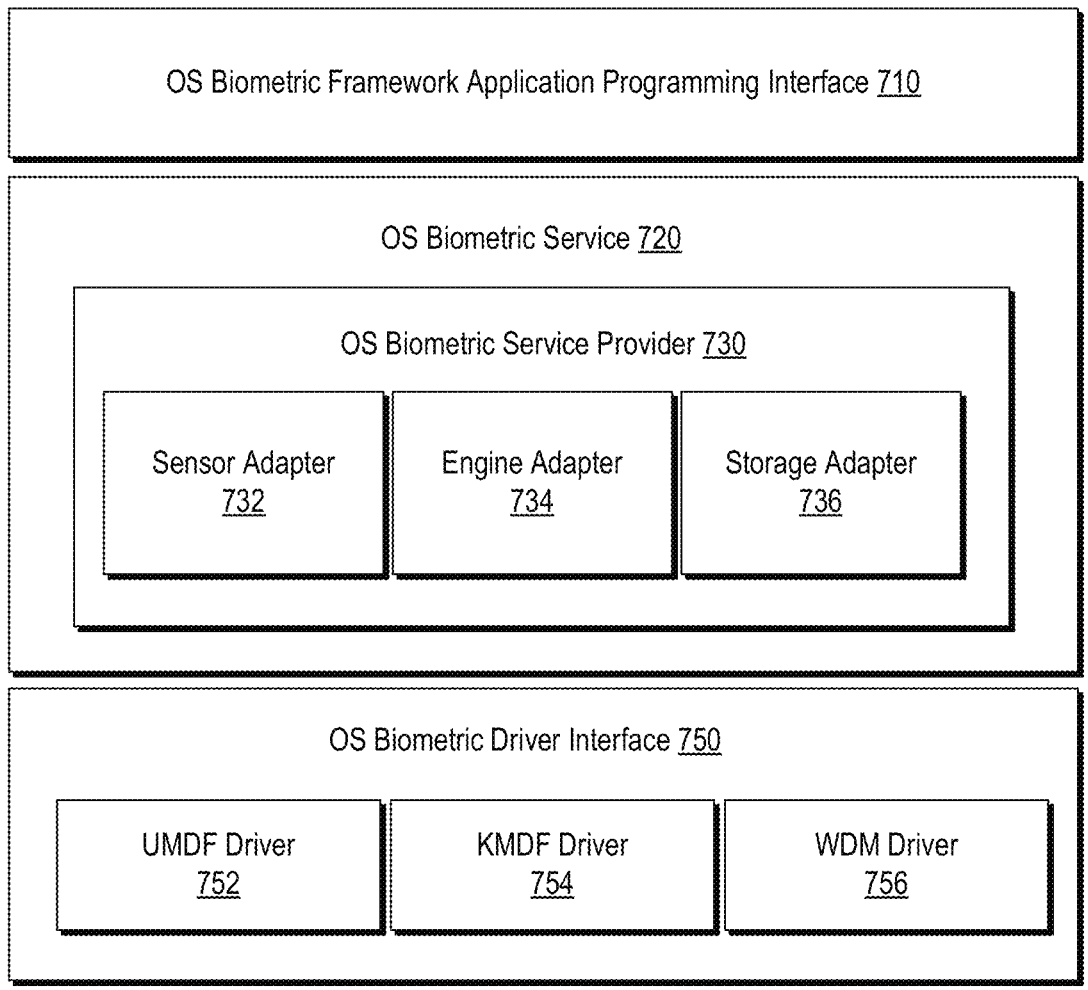
FIG. 7 is a diagram of an example of a biometric framework architecture.

FIG. 7 shows an example of a biometric framework architecture 700 that includes various features or components, including, for example, an application programming interface (API) 710, a service 720, a service provider 730, and a driver interface 750. As shown, the service provider 730 can include a sensor adapter 732, an engine adapter 734 and a storage adapter 736. As shown, the driver interface 750 can include a user-mode driver framework (UMDF) driver 752, a kernel-mode driver framework (KMDF) driver 754 and/or a WINDOWS® driver model (WDM) driver. A biometric framework may include one or more of the features or components that can operatively couple to a fingerprint reader or fingerprint readers.

The sensor adapter 732 can perform sample-capture operations (e.g., live scan fingerprint reader data acquisition). The engine adapter 734 can perform processing including, for example, one or more of data normalization, feature extraction, and biometric template generation. As an example, the engine adapter 734 may match biometric data to template(s) during enrollment, identification, and/or verification operations. The storage adapter 736 can store, manage, and retrieve one or more template.

As an example, the service provider 730 may be configured to perform one or more operations associated with augmentation. For example, the engine adapter 734 may decide when a differential exists between a live scan (e.g., live scan data) and base case data (e.g., template data) and/or between prior augmentation data and live scan data. As an example, the engine adapter 734 can include performing data augmentation where such augmentation may, via the storage adapter 736, include storing, managing and/or retrieving one or more sets of augmentation data.

As an example, circuitry and/or associated functions of one or more of the adapters 732, 734 and 736 may be native to a fingerprint reader. As an example, in an operating system (OS) environment, one or more adapter components may be provided as follows: for fingerprint readers that lack on-chip storage or matching capabilities, the service provider 730 may provide inbox reader and storage adapters components (e.g., or an independent hardware vendor (IHV) or independent software vendor (ISV) is to supply an engine adapter component); and, for fingerprint readers that do support on-chip matching and storage, an IHV or an ISV is to supply adapter components.

As an example, an application may extend a biometric framework by providing one or more management capabilities and/or enabling one or more additional scenarios, including enrollment experiences, Web single-sign-on, and management of proprietary attributes of a fingerprint reader.

Figure 8:
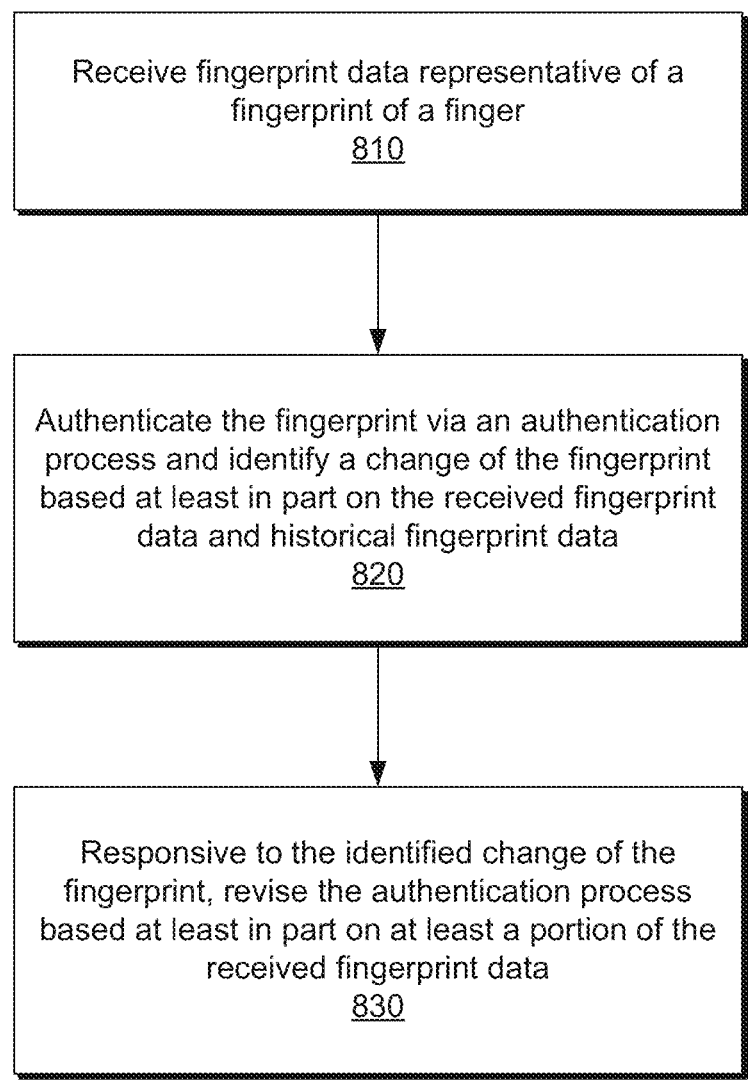
FIG. 8 is a diagram of an example of a method.

FIG. 8 shows an example of a method 800 that includes a reception block 810 for receiving fingerprint data representative of a fingerprint of a finger; an authentication block 820 for authenticating the fingerprint via an authentication process and identifying a change of the fingerprint based at least in part on the received fingerprint data and historical fingerprint data; and a revision block 830 for, responsive to the identifying the change of the fingerprint, revising the authentication process based at least in part on at least a portion of the received fingerprint data.

Figure 9:
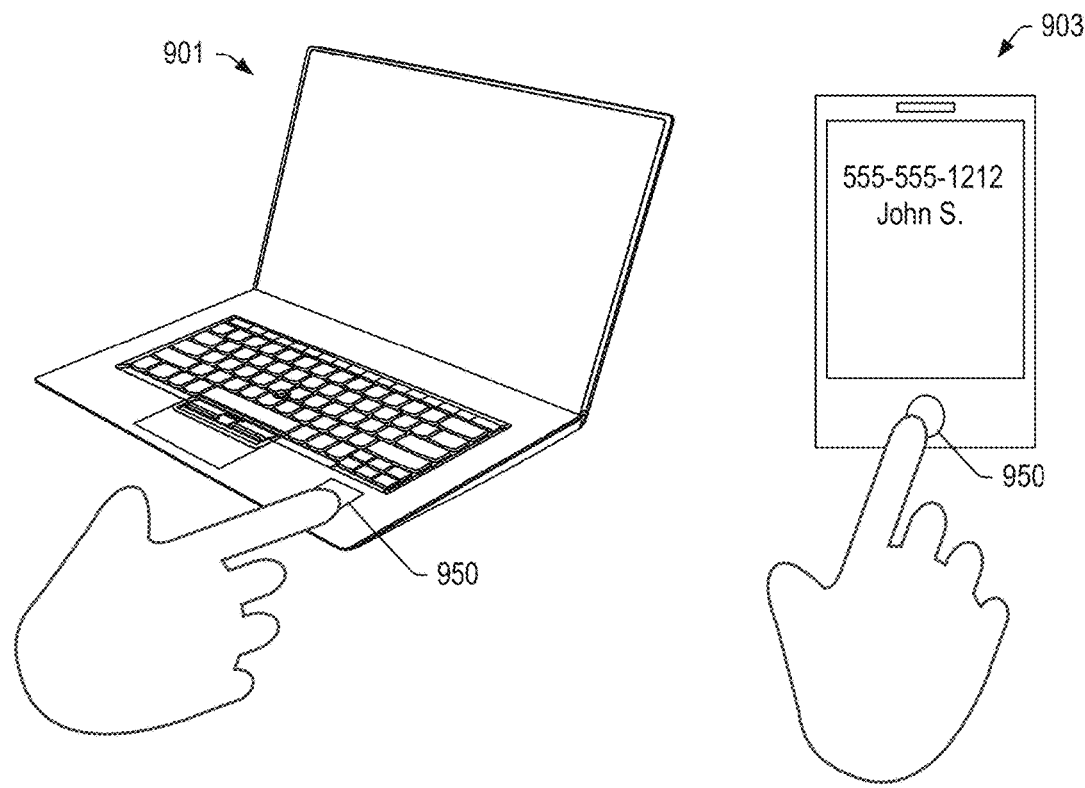
FIG. 9 is a diagram of examples of devices and examples of circuitry.

FIG. 9 shows an example of a device 901 and an example of a device 903 where each of the devices 901 and 903 includes a fingerprint reader 950.

As an example, a device can include a fingerprint reader 950 that generates fingerprint data representative of a fingerprint of a finger; circuitry 960 that authenticates the fingerprint via an authentication process and that identifies a change of the fingerprint based at least in part on the generated fingerprint data and historical fingerprint data; and circuitry 970 that, responsive to the identification of the change of the fingerprint, revises the authentication process based at least in part on at least a portion of the received fingerprint data.

As an example, a device can include one or more types of circuitry such as, for example, one or more of trend analysis circuitry 981, cleansing circuitry 982, transmission circuitry 983 (e.g., access circuitry, interface circuitry, etc.), analysis circuitry 984, diagnosis circuitry 985 and notification circuitry 986.

As an example, a device can include a fingerprint reader that generates fingerprint data representative of a fingerprint of a finger; circuitry that authenticates the fingerprint via an authentication process and that identifies a change of the fingerprint based at least in part on the generated fingerprint data and historical fingerprint data; and circuitry that, responsive to the identification of the change of the fingerprint, revises the authentication process based at least in part on at least a portion of the received fingerprint data. In such an example, the circuitry that revises the authentication process may include circuitry that statistically analyzes the at least a portion of the generated fingerprint data in combination with at least a portion of the historical fingerprint data. As an example, such a device can include augmenting at least a portion of the historical fingerprint data with and/or based at least in part on the generated fingerprint data. In such an example, augmenting can include storing particular data for a region associated with a fingerprint where, for example, a change has been detected through an analysis such as, for example, a statistical analysis.

As an example, historical fingerprint data can be or include authentication data (e.g., data that is utilized in an authentication process to authenticate a fingerprint such as via a live scan fingerprint data). As an example, circuitry that revises an authentication process can include circuitry that revises authentication data such as, for example, by augmentation of at least a portion of that data (e.g., for one or more regions of a fingerprint due to one or more non-acute changes in at least one of the one or more of regions).

As an example, a device can include circuitry that, responsive to a failure to authenticate the fingerprint, calls for rendering of information to a display. In such an example, the device may be utilized in a reenrollment process and/or, for example, a graphical user interface may render one or more graphic controls that allow for input as to a threshold or thresholds for authentication. For example, a device may implement an authentication process that utilizes one or more thresholds that are tiered according to levels of security. Such a device may utilize, by default, a threshold that corresponds to a high level of security where a user may select a less level where one or more changes have occurred to a finger (e.g., a fingerprint of a finger). In such an example, the option to adjust a level may be limited via entry of a password. A lower threshold, in comparison to a default, high security level threshold, may be, in terms of percent, a few percent less such that a user may still logon where relatively small changes to a fingerprint occur. In response to such an adjustment, a device may automatically implement a method that provides for augmentation of authentication data. In such an example, the threshold may be increased (e.g., optionally automatically) as degree of matching increases between a live scan dataset and an augmented authentication dataset.

As an example, a device can render information to a display that calls for recommencing an authentication process by instruction a user to re-scan a finger or fingers. As an example, a device can render information to a display that calls for re-enrollment of one or more fingers.

As an example, a change can be a change that is associated with a skin disease. As an example, a change can be a change that is associated with a metabolic disease. As an example, a change can be a change that is associated with heat energy. As an example, a change can be a change that is associated with friction. As an example, a change can be a change that is associated with heat energy caused by friction.

As an example, a device can include a processor, memory accessible by the processor and operating system instructions stored in the memory that are executable by the processor to establish an operating system environment. As an example, a device can include a biometric framework, which may be operatively coupled to an operating system (e.g., WINDOW® biometric framework, etc.). As an example, a device can include circuitry that performs an authentication process where authentication permits access to an operating system environment (e.g., directly and/or indirectly). As an example, authentication may permit a processor to establish an operating system environment.

As an example, a method can include receiving fingerprint data representative of a fingerprint of a finger; authenticating the fingerprint via an authentication process and identifying a change of the fingerprint based at least in part on the received fingerprint data and historical fingerprint data; and responsive to the identifying the change of the fingerprint, revising the authentication process based at least in part on at least a portion of the received fingerprint data. In such an example, revising the authentication process can include statistically analyzing the at least a portion of the received fingerprint data in combination with at least a portion of the historical fingerprint data.

As an example, historical fingerprint data can be or include authentication data. In such an example, a method can include revising an authentication process at least in part by revising authentication data. In such an example, such revision of authentication data can include augmenting authentication data. As an example, augmented authentication data can be data that include data of different ages. For example, augmented authentication data can include data of an age determined by an enrollment process (e.g., base case data) and data of one or more ages determined by a detected change in one or more regions of a fingerprint (e.g., as acquired by a live scan that is not an enrollment scan).

As an example, a method can include accessing historical fingerprint data representative of a fingerprint of a finger; receiving additional fingerprint data representative of a fingerprint of the finger; failing authenticating of the fingerprint (e.g., where a differential exists that is greater than a threshold); and, responsive to the failing, calling for rendering of information to a display. In such an example, the information can include a notification to recommence the authentication process or, for example, the information can include a notification that an authentication process will be revised to determine whether a physiological, non-acute change may have occurred to the fingerprint (e.g., in comparison to the historical fingerprint data).

One or more processor-readable storage media can include processor-executable instructions that instruct a device to: receive fingerprint data representative of a fingerprint of a finger; authenticate the fingerprint via an authentication process and identify a change of the fingerprint based at least in part on the received fingerprint data and historical fingerprint data; and responsive to the identification of the change of the fingerprint, revise the authentication process based at least in part on at least a portion of the received fingerprint data. In such an example, one or more instructions may be stored in memory of a fingerprint reader as a unit and/or may be stored in memory of a device that is operatively coupled to a fingerprint reader. As an example, a fingerprint reader may include one or more integrated circuits that provide for sandboxed authentication, storage and/or augmentation (e.g., automatic augmentation in an automated augmentation mode of operation). As an example, a device may operate in a default mode without augmentation and in an augmentation mode where the device may transition from one mode to another, responsive to scan data, receipt of input via a graphical user interface, etc. As an example, a device may operate in an augmentation mode as a default mode where, for example, the device may optionally provide for transitioning to a mode that does not provide for augmentation (e.g., a strict security mode, etc.).

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that include at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 10:
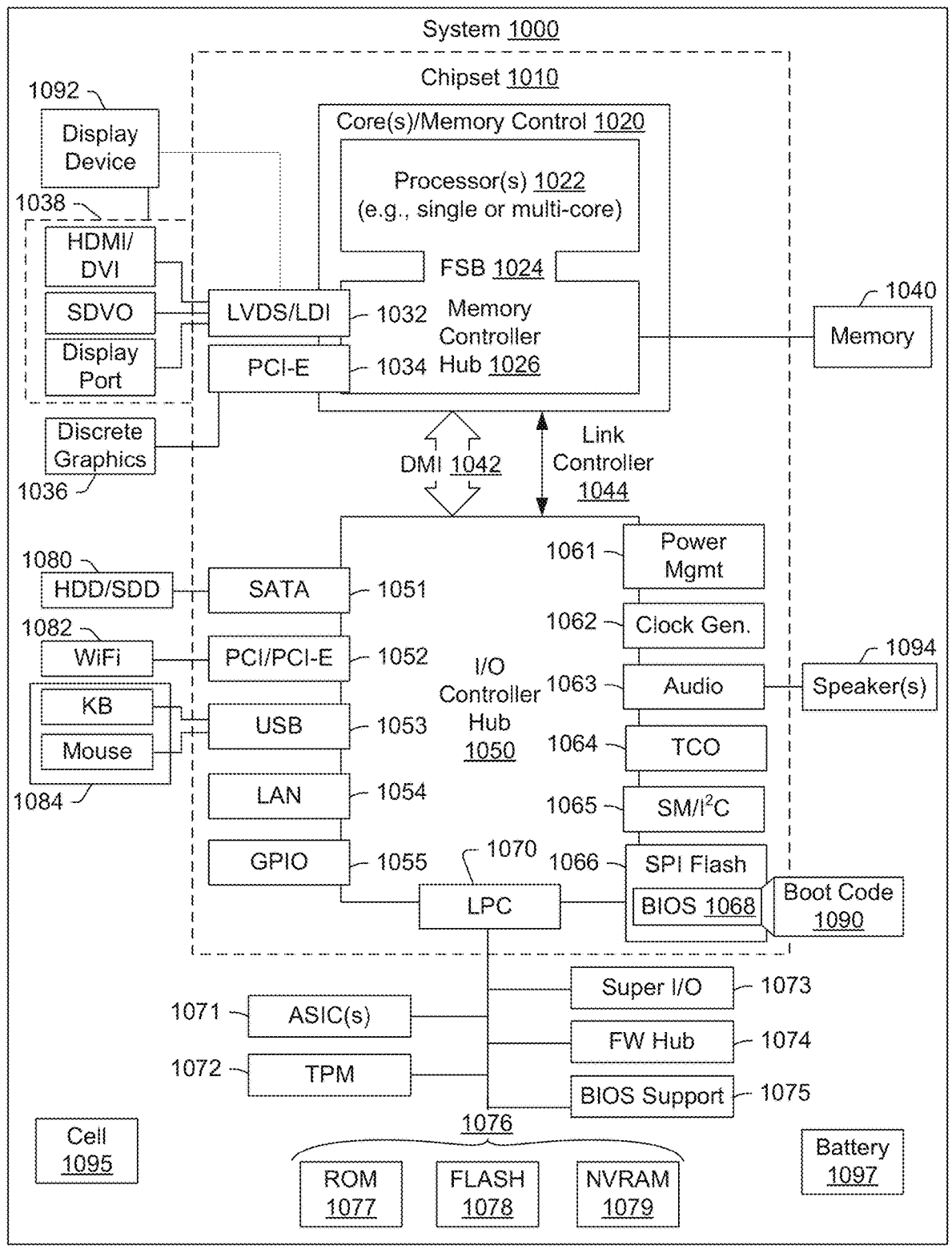
FIG. 10 is a diagram of an example of a system that includes one or more processors.

While various examples of circuits or circuitry have been discussed, FIG. 10 depicts a block diagram of an illustrative computer system 1000. The system 1000 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1000. As an example, the device 100 of FIG. 1, the device 901 of FIG. 9, the device 903 of FIG. 9, etc. can include one or more features of the system 1000 of FIG. 10.

As shown in FIG. 10, the system 1000 includes a so-called chipset 1010. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 10, the chipset 1010 has a particular architecture, which may vary to some extent depending on brand or manufacturer. The architecture of the chipset 1010 includes a core and memory control group 1020 and an I/O controller hub 1050 that exchange information (e.g., data, signals, commands, etc.) via, for example, a direct management interface or direct media interface (DMI) 1042 or a link controller 1044. In the example of FIG. 10, the DMI 1042 is a chip-to-chip interface (sometimes referred to as being a link between a "northbridge" and a "southbridge").

The core and memory control group 1020 include one or more processors 1022 (e.g., single core or multi-core) and a memory controller hub 1026 that exchange information via a front side bus (FSB) 1024. As described herein, various components of the core and memory control group 1020 may be integrated onto a single processor die, for example, to make a chip that supplants the conventional "northbridge" style architecture.

The memory controller hub 1026 interfaces with memory 1040. For example, the memory controller hub 1026 may provide support for DDR SDRAM memory (e.g., DDR, DDR2, DDR3, etc.). In general, the memory 1040 is a type of random-access memory (RAM). It is often referred to as "system memory".

The memory controller hub 1026 further includes a low-voltage differential signaling interface (LVDS) 1032. The LVDS 1032 may be a so-called LVDS Display Interface (LDI) for support of a display device 1092 (e.g., a CRT, a flat panel, a projector, etc.). A block 1038 includes some examples of technologies that may be supported via the LVDS interface 1032 (e.g., serial digital video, HDMI/DVI, display port). The memory controller hub 1026 also includes one or more PCI-express interfaces (PCI-E) 1034, for example, for support of discrete graphics 1036. Discrete graphics using a PCI-E interface has become an alternative approach to an accelerated graphics port (AGP). For example, the memory controller hub 1026 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1050 includes a variety of interfaces. The example of FIG. 10 includes a SATA interface 1051, one or more PCI-E interfaces 1052 (optionally one or more legacy PCI interfaces), one or more USB interfaces 1053, a LAN interface 1054 (more generally a network interface), a general purpose I/O interface (GPIO) 1055, a low-pin count (LPC) interface 1070, a power management interface 1061, a clock generator interface 1062, an audio interface 1063 (e.g., for speakers 1094), a total cost of operation (TCO) interface 1064, a system management bus interface (e.g., a multi-master serial computer bus interface) 1065, and a serial peripheral flash memory/controller interface (SPI Flash) 1066, which, in the example of FIG. 10, includes BIOS 1068 and boot code 1090. With respect to network connections, the I/O hub controller 1050 may include integrated gigabit Ethernet controller lines multiplexed with a PCI-E interface port. Other network features may operate independent of a PCI-E interface.

The interfaces of the I/O hub controller 1050 provide for communication with various devices, networks, etc. For example, the SATA interface 1051 provides for reading, writing or reading and writing information on one or more drives 1080 such as HDDs, SDDs or a combination thereof. The I/O hub controller 1050 may also include an advanced host controller interface (AHCI) to support one or more drives 1080. The PCI-E interface 1052 allows for wireless connections 1082 to devices, networks, etc. The USB interface 1053 provides for input devices 1084 such as keyboards (KB), one or more optical sensors, mice and various other devices (e.g., microphones, cameras, phones, storage, media players, etc.). On or more other types of sensors may optionally rely on the USB interface 1053 or another interface (e.g., I²C, etc.). As to microphones, the system 1000 of FIG. 10 may include hardware (e.g., audio card) appropriately configured for receipt of sound (e.g., user voice, ambient sound, etc.).

In the example of FIG. 10, the LPC interface 1070 provides for use of one or more ASICs 1071, a trusted platform module (TPM) 1072, a super I/O 1073, a firmware hub 1074, BIOS support 1075 as well as various types of memory 1076 such as ROM 1077, Flash 1078, and non-volatile RAM (NVRAM) 1079. With respect to the TPM 1072, this module may be in the form of a chip that can be used to authenticate software and hardware devices. For example, a TPM may be capable of performing platform authentication and may be used to verify that a system seeking access is the expected system.

The system 1000, upon power on, may be configured to execute boot code 1090 for the BIOS 1068, as stored within the SPI Flash 1066, and thereafter processes data under the control of one or more operating systems and application software (e.g., stored in system memory 1040). An operating system may be stored in any of a variety of locations and accessed, for example, according to instructions of the BIOS 1068. Again, as described herein, a satellite, a base, a server or other machine may include fewer or more features than shown in the system 1000 of FIG. 10. Further, the system 1000 of FIG. 10 is shown as optionally include cell phone circuitry 1095, which may include GSM, CDMA, etc., types of circuitry configured for coordinated operation with one or more of the other features of the system 1000. Also shown in FIG. 10 is battery circuitry 1097, which may provide one or more battery, power, etc., associated features (e.g., optionally to instruct one or more other components of the system 1000). As an example, a SMBus may be operable via a LPC (see, e.g., the LPC interface 1070), via an I²C interface (see, e.g., the SM/I²C interface 1065), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A device comprising:
a fingerprint reader that generates fingerprint data representative of a fingerprint of a finger;
circuitry that authenticates the fingerprint via an authentication process that fails generated fingerprint data of a first read by a comparison to a recognition dataset and passes generated fingerprint data of a subsequent read by a comparison to the recognition dataset, and that identifies a change of the fingerprint that is less than a threshold based at least in part on the generated fingerprint data of the first read; and
circuitry that, responsive to the authentication of the fingerprint and the identification of the change of the fingerprint that is less than the threshold, revises the authentication process by adding at least a portion of the generated fingerprint data of the first read to the recognition dataset.

2. The device of claim 1 wherein the circuitry that revises the authentication process comprises circuitry that statistically analyzes the at least a portion of the generated fingerprint data of the first read in combination with at least a portion of the generated fingerprint data of the subsequent read.

3. The device of claim 1 comprising circuitry that, responsive to a failure to authenticate the fingerprint after a predetermined number of reads, calls for rendering of information to a display.

4. The device of claim 1 wherein the change is associated with a skin disease.

5. The device of claim 1 wherein the change is associated with a metabolic disease.

6. The device of claim 1 wherein the change is associated with wear of skin.

7. The device of claim 1 comprising a processor, memory accessible by the processor and operating system instructions stored in the memory that are executable by the processor to establish an operating system environment.

8. The device of claim 7 wherein the authentication permits access to the operating system environment.

9. The device of claim 7 wherein the authentication permits the processor to establish the operating system environment.

10. A method comprising:
performing an authentication process that comprises
receiving first fingerprint data representative of a fingerprint of a finger,
failing to authenticate the fingerprint using the first fingerprint data and a recognition dataset,
receiving subsequent fingerprint data representative of the fingerprint of the finger, and
authenticating the fingerprint using the subsequent fingerprint data and the recognition dataset and identifying a change of the fingerprint that is less than a threshold based at least in part on the received first fingerprint data; and
responsive to the authenticating the fingerprint and the identifying the change of the fingerprint that is less than the threshold, revising the authentication process by adding at least a portion of the first fingerprint data to the recognition dataset.

11. The method of claim 10 wherein revising the authentication process comprises statistically analyzing the at least a portion of the received first fingerprint data in combination with at least a portion of the received subsequent fingerprint data.

12. The method of claim 10 comprising receiving multiple instances of additional fingerprint data representative of the fingerprint of the finger; failing the authentication process of the fingerprint after a predetermined number of the multiple instances; and, responsive to the failing of the authentication process, calling for rendering of information to a display.

13. The method of claim 10 wherein the change is associated with a skin disease.

14. The method of claim 10 wherein the change is associated with a metabolic disease.

15. The method of claim 10 wherein the change is associated with wear of skin.

16. One or more processor-readable storage media comprising processor-executable instructions that instruct a device to:
perform an authentication process that comprises
reception of first fingerprint data representative of a fingerprint of a finger,
failure to authenticate the fingerprint using the first fingerprint data and a recognition dataset,
reception of subsequent fingerprint data representative of the fingerprint of the finger, and
authentication of the fingerprint using the subsequent fingerprint data and the recognition dataset and identification of a change of the fingerprint based at least in part on the received first fingerprint data; and
responsive to the authentication of the fingerprint and the identification of the change of the fingerprint, revise the authentication process by adding at least a portion of the first fingerprint data to the recognition dataset.

17. The one or more processor-readable storage media of claim 16 comprising processor-executable instructions that instruct the device to receive multiple instances of additional fingerprint data representative of the fingerprint of the finger; fail the authentication process of the fingerprint after a predetermined number of the multiple instances; and, responsive to the fail, call for rendering of information to a display.

* * * * *